(12) United States Patent
Plessing (10) Patent No.: US 10,183,350 B2
(45) Date of Patent: Jan. 22, 2019

(54) MACHINING HEAD HAVING A BALANCING DEVICE

(71) Applicant: Liebherr-Verzahntechnik GmbH, Kempten/Allgaeu (DE)

(72) Inventor: Matthias Plessing, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 32 days.

(21) Appl. No.: 15/268,144

(22) Filed: Sep. 16, 2016

(65) Prior Publication Data

US 2017/0095868 A1    Apr. 6, 2017

(30) Foreign Application Priority Data

Oct. 5, 2015    (DE) .................. 10 2015 012 818

(51) Int. Cl.

| B23F 23/10 | (2006.01) |
|---|---|
| B24B 27/00 | (2006.01) |
| B23F 1/02 | (2006.01) |
| B23F 5/04 | (2006.01) |
| B24B 49/10 | (2006.01) |
| B23Q 17/12 | (2006.01) |
| G01M 1/32 | (2006.01) |
| B24B 47/12 | (2006.01) |

(52) U.S. Cl.
CPC .............. *B23F 23/10* (2013.01); *B23F 1/023* (2013.01); *B23F 1/026* (2013.01); *B23F 5/04* (2013.01); *B23Q 17/12* (2013.01); *B24B 27/0076* (2013.01); *B24B 49/10* (2013.01); *G01M 1/32* (2013.01); *B24B 47/12* (2013.01)

(58) Field of Classification Search
CPC .. B23F 1/02; B23F 1/023; B23F 1/026; B23F 5/02; B23F 5/04; B23F 23/10; B23Q 17/12; B24B 27/0076; B24B 33/081; B24B 47/12; B24B 47/20; B24B 47/22; B24B 49/10; B24B 49/16
See application file for complete search history.

(56) References Cited

U.S. PATENT DOCUMENTS

| 3,579,315 A * | 5/1971 | Hufendick | .............. B24B 3/027 |
|---|---|---|---|
| | | | 451/48 |
| 8,313,357 B2 * | 11/2012 | Heyder | ................... B23F 15/08 |
| | | | 451/10 |
| 8,858,297 B2 * | 10/2014 | Yanase | ...................... B23F 5/02 |
| | | | 451/47 |

(Continued)

FOREIGN PATENT DOCUMENTS

| DE | 19711726 A1 | 10/1998 |
|---|---|---|
| DE | 102009039752 A1 | 3/2011 |

(Continued)

*Primary Examiner* — Timothy V Eley
(74) *Attorney, Agent, or Firm* — McCoy Russell LLP (57) ABSTRACT

The present disclosure relates to a machining head for a gear manufacturing machine having at least one driven motor spindle and at least one counter-spindle, wherein a tool arbor having at least one tool arranged thereon is mounted between the motor spindle and the counter-spindle, and wherein at least one balancing device is integrated within the driven motor spindle and at least one balancing device is integrated within the counter-spindle.

15 Claims, 4 Drawing Sheets

(56) References Cited

U.S. PATENT DOCUMENTS

2011/0183585 A1* 7/2011 Woelfel ................... B23F 1/02
                                                    451/57
2012/0129433 A1* 5/2012 Makiuchi ................ B24B 5/045
                                                    451/5
2012/0282056 A1* 11/2012 Zindl ....................... B23Q 3/12
                                                    409/232

FOREIGN PATENT DOCUMENTS

DE      102012018358 A1    2/2014
EP           1870198 A1   12/2007

* cited by examiner

Figure 1

Prior Art

MACHINING HEAD HAVING A BALANCING DEVICE

CROSS REFERENCE TO RELATED APPLICATION

This application claims priority to German Patent Application No. 10 2015 012 818.3, entitled "Machining Head Having a Balancing Device," filed Oct. 5, 2015, the entire contents of which are hereby incorporated by reference in its entirety for all purposes.

TECHNICAL FIELD

The present disclosure relates to a machining head for a gear manufacturing machine, preferably a gear grinding machine.

BACKGROUND AND SUMMARY

Tools, specifically dressable grinding tools, have to be balanced to achieve high-quality work results. Depending on whether the tool arbor has one or more disc-shaped tools and/or one or more cylindrical tools, the tools may be balanced in one balancing plane or in two balancing planes.

Imbalances are rotary forces which arise with rotating bodies when the masses of the rotating bodies are asymmetrically distributed about a center. If a body rotates about an axis of rotation, outwardly acting centrifugal forces arise. If the mass is uniformly distributed in the rotational body, the centrifugal forces cancel each other out and the body remains in situ during the rotation. If, in contrast, the mass is unevenly distributed, additional forces and torques act on the body which cause a relative movement of the rotational body with respect to the axis of rotation. As a result, if the body is fixed into position by a bearing, strain may arise on the bearing.

There are two types of imbalance which can also occur in combination, namely static and dynamic imbalances. If the mass body is seen as a small slim disk having a mass the centers of mass are at the same spacing n and in the same direction with respect to the axis of rotation. This has the consequence with a static imbalance that the center of mass of the rotational body does not lie on the axis of rotation, but rather that the central principal axis of inertia is parallel at a spacing e from the axis of rotation. Centrifugal forces thus act perpendicular to the axis of rotation while the mass body rotates and can no longer be compensated. The imbalance $U_i$ is produced which is defined as the product of the point mass $m_i$ and its spacing $r_i$ from the axis of rotation. This static imbalance can be measured in a stationary state. For example, an imbalance scale can measure the static imbalance of grinding wheels.

With a dynamic imbalance, the center of mass of the rotational body lies on the axis of rotation, but the principal axis of inertia is at an angle relative to the axis of rotation. The reason for this is that the center of mass of the individual discs does not lie on the axis of rotation. Considered on their own, these small discs therefore have centrifugal forces generating an imbalance. The imbalance forces admittedly add up to zero, i.e. no forces are produced in a lateral direction; however, since they lie on parallel lines of application, they result in a moment load acting on the rotational body. A so-called bending moment therefore arises during the rotation. A non-uniform wobbling rotational movement is produced as a result. The dynamic imbalance can only be measured with a rotating rotational body. With technical rotational bodies, a general dynamic imbalance is typically present, i.e. a combination of static and dynamic imbalance.

An imbalance in tool holders arises when defects in design, drawing, material, production or installation are present. In addition to the named defects, imbalances can furthermore occur with dressable grinding tools due to different material densities or different amounts of coolant flowing to the grinding tool.

Tools having a large amount of imbalance have a negative effect on many aspects of machining. For example, an imbalanced tool may produce a poorer surface quality in machined workpieces due to vibrations at a tool holder holding the tool, oscillations at the tool holder, a restriction of achievable cutting speeds, reduced production accuracy, and/or increased down time of the tools due to uneven blade wear.

To avoid these negative effects, it is recommended to balance the tool holder or, even better, to balance the tool holder with clamped tool, in accordance with technically feasible and economically meaningful balance quality. During balancing, the asymmetrical mass distribution of the tool holder is compensated in that either mass is attached, mass is removed or mass is displaced. It is the aim of the balancing to restrict bearing forces, bearing vibrations and wave deformations to acceptable values.

To compensate an imbalance, it must first be analytically determined using measurement processes. The centrifugal forces which occur are measured by means of vibration sensors and the imbalance and the required imbalance compensation are calculated. The required adaptations at the tool system are then carried out using data. Such tools are balanced either on a separate balancing machine and/or on the manufacturing machine. Tools which are dressed on a manufacturing machine also change their balance state due to the dressing process. It is therefore always advantageous in such a case to balance these tools still on the manufacturing machine.

Attempts to address imbalance include a balancing system European Patent No. 1 870 198 A1. Therein, a balancing system for balancing a grinding wheel is shown which is arranged directly below the grinding tool in the tool arbor. The balance state of the tool is detected via a corresponding sensor system and is evaluated by a processing unit. Control signals are output to the balancing unit as the result of the evaluation to adjust the balancing weights accordingly.

However, the inventors herein have recognized potential issues with such systems. As one example, such systems are well-suited for wide tools and large worm diameters since the tool bore is dimensioned sufficiently, and the tool arbor offers sufficient room for the accommodation of the balancing heads. However, as the available space is reduced, the size of the balancing weights used and the maximum compensable imbalance are also reduced. Large imbalances must, however, in particular often be corrected with fast-turning tools.

If furthermore workpieces are to be machined which are collision-prone, the use of grinding worms having very small diameters or of grinding wheels with very small grinding wheel diameters or a combination of the two is necessary. These systems generally are not appropriate for tools with very small diameters since the tool arbor for receiving the grinding tools has to have a certain minimum diameter for receiving the balancing head.

The object of the present application is to provide an innovative construction of a machining head for a gear generating machine, the machining head comprising a balancing system for small-dimension tools or tool arbors for the gear machining or machining in this manner of workpieces which are in particular collision prone. These small tool diameters are selected when otherwise too large a tool diameter would produce an unwanted collision between the tool and diameters adjacent to the gearing or further gearings at the workpiece.

This object is achieved by a machining head for a gear manufacturing machine, comprising: at least one driven motor spindle including at least one balancing device integrated within the at least one driven motor spindle; at least one counter-spindle including at least one balancing device integrated within the at least one counter-spindle; and a tool arbor having at least one tool arranged thereon mounted between the motor spindle and the counter-spindle.

In accordance with the present disclosure, a machining head for a gear manufacturing machine is proposed which comprises at least one driven motor spindle for receiving a tool arbor. A balancing device for correcting imbalances of the received tool is integrated in accordance with the present disclosure within the driven motor spindle. The tool arbor is received at both sides, i.e., on the one hand, by the motor spindle, and on the other hand, by an oppositely disposed counter-spindle. The counter-spindle also comprises at least one integrated balancing device. The balancing devices of the motor spindle and of the counter-spindle preferably comprise balancing weights or balancing heads whose positions can be adjusted to compensate an imbalance (e.g., the components distributed over the motor spindle and the counter-spindle can form a common two-plane balancing system for compensating an imbalance).

The integration of the balancing device into the motor spindle or counter-spindle allows the reception of different tool arbors or the use of different tools independently of their diameters. Tools, in particular grinding wheels or grinding worms, having very small diameters can thereby be used in particular to manufacture gears on workpieces prone to collisions. The minimum tool bore diameter in this respect depends on the required balancing capacity to be achieved. The greater the required capacity, the greater the mounting bore for the balancing system has to be. In this respect, tool bore diameters below 50 mm are, for example, no longer suitable to integrate a conventional balancing system in accordance with the prior art into the tool arbor.

Not only the use of different tool arbors having particularly small diameters is made possible by the integration of the balancing devices within the motor spindle or counter-spindle, but any projecting edges are also omitted which possibly arise due to the arrangement of the balancing devices at or around the tool arbor. The integrated balancing devices in particular do not influence the possible shift path of the tool or of the tool arbor in the V direction, i.e. along the axis of rotation of the tool. This is in particular of advantage in gear manufacturing machining or gear grinding machining since here different regions of a tool are brought into engagement with the workpiece by a shift in the direction of the V axis. It is likewise conceivable to arrange a plurality of the same tools or also of different tools on the tool arbor such as a grinding wheel or a grinding worm which can be alternately brought into engagement with the workpiece by a shift movement. The complete integration of the balancing devices within the motor spindle or the counter-spindle does not influence the maximum shift movement.

The balancing devices of the motor spindle and/or of the counter-spindle are ideally completely or at least almost completely encompassed within the housing of the motor spindle or of the counter-spindle. For example, the balancing device of the motor spindle can be arranged within the rotor, while the balancing device of the counter-spindle is within the spindle shaft rotatably supported there.

The balancing devices of the motor spindle and/or counter-spindle can each comprise one or more balancing weights, for example, which are adjustable in the radial direction of the respective spindle so that compensation can take place by radial displacement of the balancing weights in dependence on the measured vibrations. An embodiment is likewise conceivable having a plurality of radially arranged chambers having different liquid quantities. The balance state of the spindles can be varied by a controlled variation of the filling level of the liquid chambers.

An alternative embodiment of the balancing device can be based on at least one balance weight per balancing device/balancing plane, which is electromechanically adjustable about the middle axis by means of at least one motor. A balancing in two balancing planes can thereby be implemented.

An arrangement of the balancing device within the motor spindle or within the counter-spindle behind or below the front spindle bearing is particularly preferred. The front spindle bearing corresponds to the bearing which is arranged spatially closer to the tool arbor.

At least one vibration sensor, preferably at least one acceleration sensor, is provided to detect any imbalances, ideally a vibration sensor per balancing plane and thus respectively one for the motor spindle and a further vibration sensor for the counter-spindle. The vibration sensors preferably serve the recording of the vibrations during gear manufacturing machining, ideally vibrations of the total system of tool arbor, received tools and spindles. The vibration sensors can preferably be in communication with a control. The control determines control pulses for setting the balancing systems from the vibration signals, said control pulses having to be transmitted contactlessly via signal transmitters into the balancing devices.

One or more signal transmitters can be provided to transmit the correction signal determined in the control back to the balancing device after the imbalance signals have been converted into correction values within the control. The signal transmitters can, for example, be arranged at the rear end, i.e. at the end disposed opposite the tool arbor, of the motor spindle or of the counter-spindle.

The machining head can in particular be designed such that the spacing between the counter-spindle and the motor spindle can be variably set. The machining head can thereby be usable for different tool lengths in that it is variably adjustable per tool length or tool arbor length. This flexible configuration possibility first arises in that the balancing device is encompassed in the motor spindle or in the counter-spindle and is not attached to or in the tool arbor itself.

The machining head is in particular dimensioned for very small grinding wheels or small grinding worms. Such small-dimension tools are preferably operated at high speeds of revolution. The motor spindle is accordingly preferably designed for a spindle speed of more than 8,000 revolutions per minute.

In addition to the machining head, the present disclosure likewise relates to a gear manufacturing machine for grinding gearings using at least one machining head in accordance with the present disclosure or with an advantageous embodiment of the present disclosure. The gear manufacturing machine is consequently characterized by the same advantages and properties as the machining head in accordance with the present disclosure so that a repeat description is omitted at this point.

The gear manufacturing machine comprises at least one control which can be communicationally connected to one or more vibration sensors and signal transmitters of the machining head or corresponding evaluation electronics. The control is in particular suitable for receiving one or more vibration parameters from the vibration sensors and for generating corresponding adjustment values for the one or more balancing devices of the motor spindle and/or counter-spindle in dependence on the received vibration parameters. The control parameters are ideally likewise generated in dependence on the current spindle speed of the motor spindle and/or on the current angular position of the motor spindle/counter-spindle to compensate imbalances detected by means of the vibration sensors.

Further advantages and properties of the present disclosure will be explained in more detail in the following with reference to various embodiments.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-4 are shown to scale, though other relative dimensions may be used.

DETAILED DESCRIPTION

Figure 1:
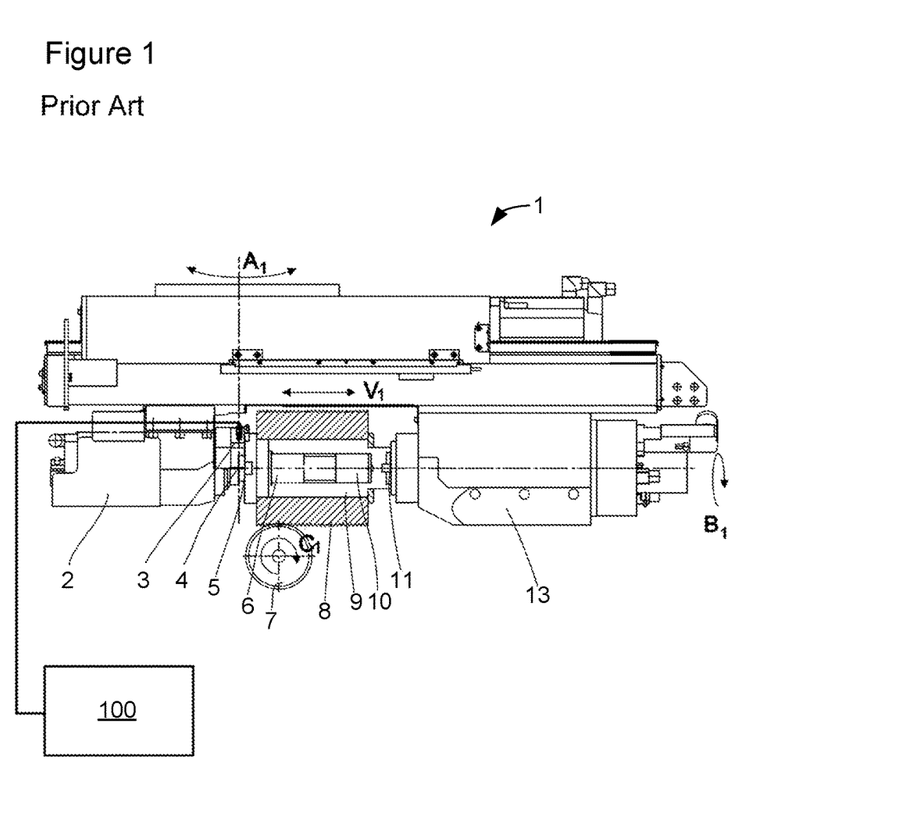
FIG. 1 shows a machining head in accordance with the prior art.

To begin, a conventional embodiment of the prior art will be looked at with reference to FIG. 1. FIG. 1 shows a grinding head 1 of a machine in accordance with the prior art for receiving grinding worms by a balancing device. The drive of a tool 8, in this case a grinding worm, takes place in the embodiment via a motor spindle 13 (which may herein be referred to as a motor-driven spindle) which includes a rotor configured to rotate in response to an electrical signal from control system 100. The tool 8 is clamped between the motor spindle 13 and the counter-bearing 2 via the tool mount interfaces 5.

In one example, control system 100 may be a microcomputer, including microprocessor unit, input/output ports, an electronic storage medium for executable programs and calibration values (such as a memory chip for storing executable instructions), random access memory, keep alive memory, and a data bus.

A first vibration sensor 11 is integrated in motor spindle 13, and a second vibration sensor 4 is integrated in counter-bearing 2, and the signals relevant to the respective vibration planes are recorded via it. The recorded vibration signals are evaluated in the control system 100 together with the data relating to the angular position and to the speed of the motor spindle and are converted into correction values which are subsequently sent as setting values via the data interface 3 to the two-plane balancing heads 6, 10 arranged in the tool arbor 9.

This embodiment is well-suited for wide tools (such as tool 8) and large worm diameters in accordance with the prior art since the tool bore is dimensioned sufficiently to receive the tool arbor having the balancing heads 6, 10. A workpiece 7 is shown in direct contact with tool 8. If, however, a collision-prone workpiece is to be machined, the use of grinding worms with smaller diameters, smaller grinding wheel diameters or a combination of the two is required. The system reaches its limits here since the tool arbor 9 for receiving the grinding tools is then smaller than the required minimum diameter for receiving the balancing heads 6, 10.

Figure 2A:
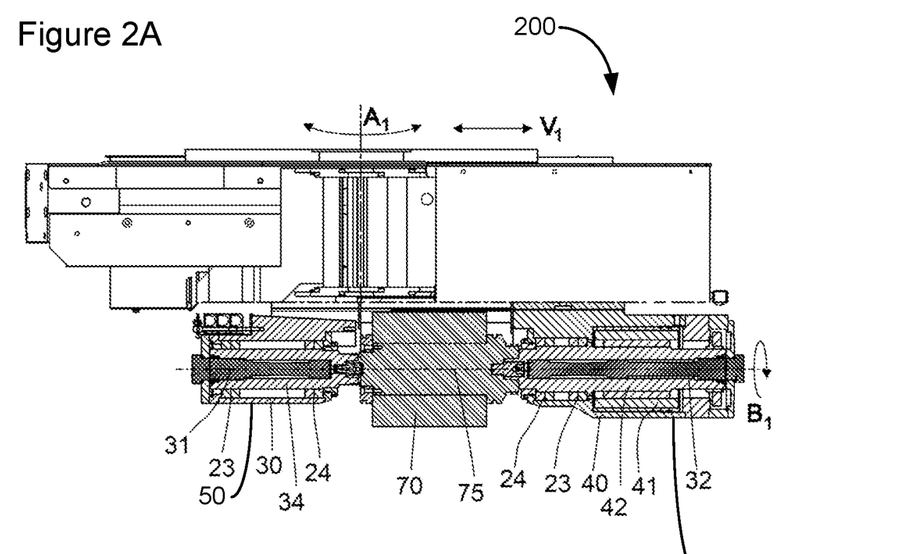
FIG. 2A shows a cross-sectional representation of the machining head in accordance with the present disclosure.

A machining head 200 in accordance with the present disclosure is shown in FIG. 2A. In one example, the machining head 200 is coupled to a gear manufacturing machine. A grinding wheel 70 is seated on a tool arbor 75 and is likewise clamped via interfaces between a motor spindle 40 having a drive motor 41 and a counter-spindle 30, with a distance between the motor spindle 40 and the counter-spindle 30 being adjustable. Depending on the tool length or the length of the tool arbor 75, the counter-spindle 30 is correspondingly set in its position in that it is moved or displaced in the V1 direction. In other words, a spacing between the motor spindle 40 and the counter-spindle 30 is adjustable such that the tool length and the length of the tool arbor 75 may fit between the motor spindle 40 and counter-spindle 30. An adaptation of the tool pivot angle takes place via the A1 axis. The tool position is thus adapted to the helix angle of the gearing and is additionally adapted to its lead angle with worm-type tools. In gear manufacturing machining, for quality reasons an ideal positional dependency between the tool and the workpiece (C1 axis) or the machined tooth space is always important. The axial movements take place with position orientation with respect to one another by means of axis B1 for this reason. The tool can be moved (shifted) tangentially to the workpiece via the V1 axis. The tool can thus be utilized over its total width, provided no projecting contour is present.

A first balancing device 32 is positioned within a housing 51 of the motor spindle 40 (which may herein be referred to as a motor-driven spindle), and a second balancing device 31 is positioned within a housing 50 of the counter-spindle 30. In one example, the first balancing device 32 is positioned within (and coupled with) rotor 42 of motor spindle 40, and the second balancing device 31 is positioned within (and coupled with) rotatable shaft 34 of the counter-spindle 30. The first balancing device 32 and second balancing device 31 may be positioned along the axis B1 (which may be referred to herein as a shared axis). The rotor 42 and the rotatable shaft 34 are each supported in their housings via spindle bearings 23, 24. The spindle bearings 24 (which may be referred to herein as front bearings) are positioned closer to the tool arbor 75 than the spindle bearings 23 (which may be referred to herein as rear bearings). Together, the first balancing device 32 and the second balancing device 31 form a two-plane balancing device. In other words, a position of the first balancing device 32 relative to the tool arbor 75 is independently adjustable compared to a position of the second balancing device 31 relative to the tool arbor 75. In this way, the position of the first balancing device 32 may be adjusted by a first amount by a first actuator (such as a solenoid, step motor, etc., not shown) while the position of the second balancing device 31 may be adjusted by a second amount by a second actuator (similar to the first actuator, not shown), with the second amount the same or different from the first amount, in order to reduce a vibration of the tool arbor 75.

Vibration signals are recorded and are transmitted to the control of the gear manufacturing machine with the aid of at least one vibration sensor per motor spindle 40 and counter-spindle 30. The recorded vibration signals are then evaluated in the control system together with the data relating to the angular position and to the speed of the motor spindle 40 and are converted into correction values which are subsequently sent as setting values via a data interface to the two-plane balancing devices 31, 32 arranged in the motor spindle 40 and the counter-spindle 30.

Figure 2B:
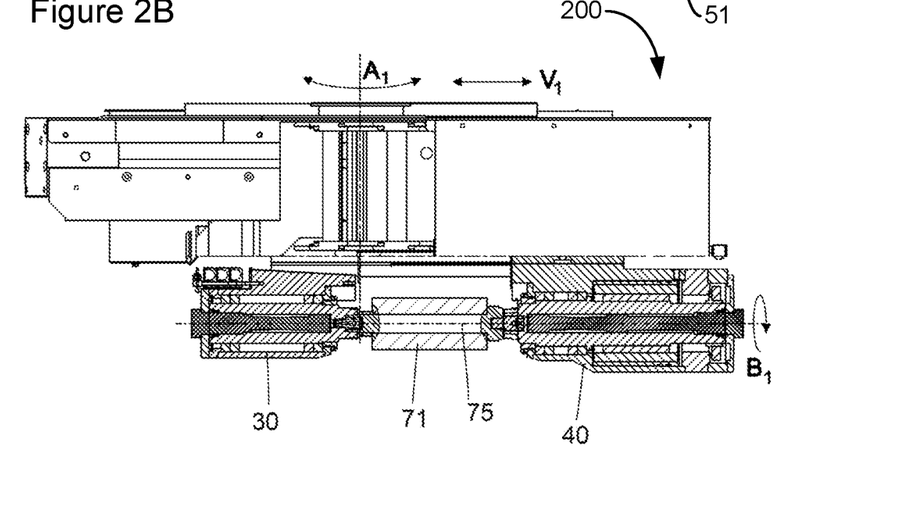
FIG. 2B shows the machining head of FIG. 2A with a small-dimension grinding tool.

With the tool arbor 75 used here, the arrangement of a balancing unit within the tool arbor 75 would not be a problem due to the tool arbor diameter used here; the situation is different, in contrast, on the use of the tool arbor 75 in accordance with FIG. 2B. FIGS. 2B, 3A, 3B, 3C and 4 show the machining head 200 in accordance with the present disclosure of FIG. 2A, but by using different tool arbors 75 for different grinding processes.

A grinding worm 71 having a small outer diameter is placed on the tool arbor 75 having a correspondingly smaller diameter in FIG. 2B. The grinding worm 71 is used when the small outer diameter of the grinding worm is desired due to a collision contour at the workpiece so that the workpiece can be generating ground despite the projecting contour. With this diameter or with even smaller tool arbor diameters, there is no longer any space within the tool arbor 75 for a corresponding balancing unit, above all when sufficient balancing capacity should still be provided.

Figure 3A:
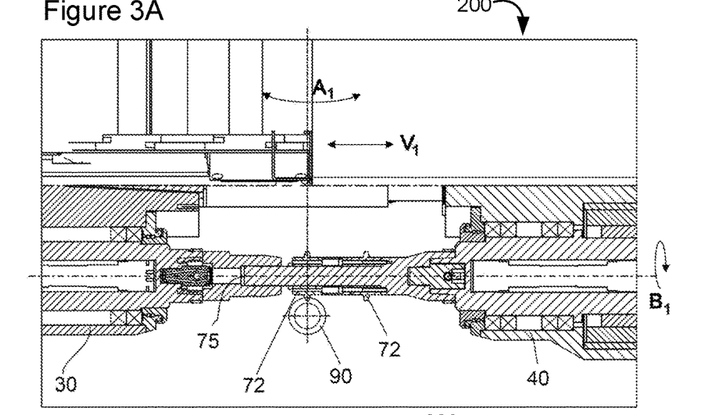
FIG. 3A shows a further representation of the machining head in accordance with the present disclosure with an alternative grinding tool.
Figure 3B:
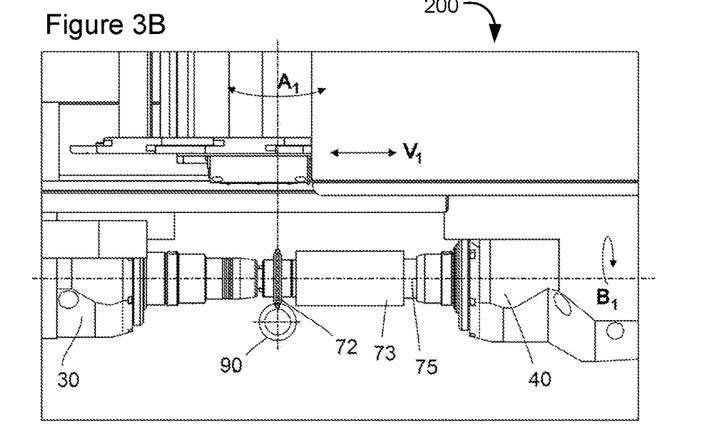
FIG. 3B shows a further representation of the machining head in accordance with the present disclosure with an alternative tool configuration.

In FIG. 3A, a use of very small grinding wheel diameters is shown such as are frequently used for the gear manufacturing of workpieces 90 having very small workpiece diameters, in particular having projecting contours. The combination tool shown in FIG. 3B of a grinding worm 73 and a grinding wheel 72 likewise serves the machining of workpieces 90 having very small workpiece diameters with a projecting contour. The rough machining is carried out with the grinding worm 73 in this case and this can thus take place considerably faster than an individual machining of each tooth space by the grinding wheel 72. The quality demand on the gearing, above all the surface roughness at the tooth trace, is then achieved by the machining with the grinding wheel 72 or with a finishing wheel package.

Figure 3C:
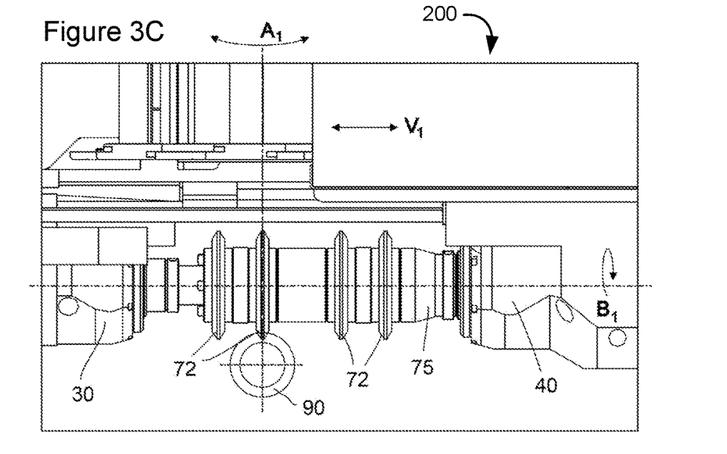
FIG. 3C shows a representation of the machining head in accordance with the present disclosure with a multiple loading of the tool arbor with different grinding wheels.

FIG. 3C shows a tool arbor having four separate grinding wheels 72 such as is frequently used with two-gearing systems. Each pair of grinding wheels 72 are used for machining a gearing. It is usually a roughing wheel or finishing wheel. The use of wheel packages, so-called multiple wheels, would, however, equally be possible.

Figure 4:
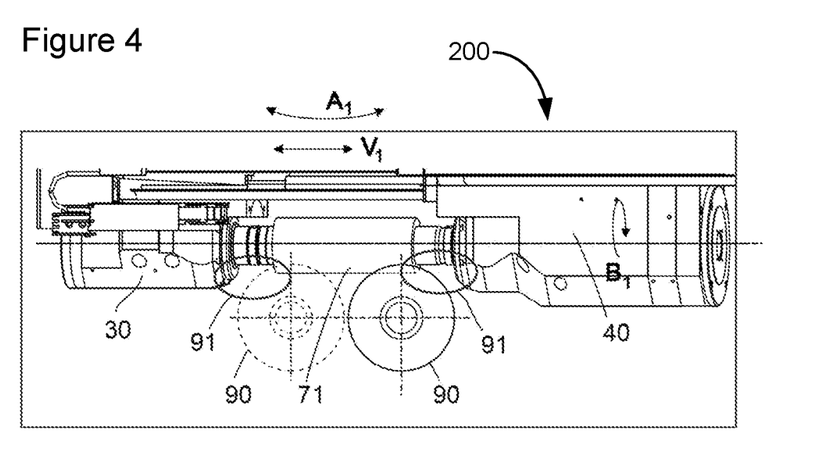
FIG. 4 shows a further representation of the machining head in accordance with the present disclosure for illustrating possible projecting edges in gear manufacturing machining.

FIG. 4 represents a special feature of gear manufacturing machines with respect to other machine tools. With gear manufacturing machines and worm-type tools (such as grinding worm 71), the tool is utilized over its entire length. Once a workpiece has been machined, the tool is typically displaced/shifted by a specific value in the $V_1$ direction (as represented by a first position of workpiece 90 relative to the tool shown by a dotted line, and a second position of the workpiece 90 relative to the tool shown by a solid line). A uniform wear of the tool or a uniform tool heating is achieved with this process.

In some instances, a particularly modified tool may be shifted diagonally during grinding while the workpiece 90 is machined to achieve specific geometries at the workpiece 90. The circumstance results from this that particularly in the marginal tool regions the motor spindle 40 and the counter-spindle 30 have to be taken into account as additional projecting contours depending on the helix angle of the gearing. The two regions 91 represent regions which should remain as free of projecting contours as possible. It is therefore necessary for reasons of tool arbor stability, however, that they may not become too long, in particular with thin tools (such as grinding worm 71), or thin tool arbors to have a sufficient stability. A transmission unit for the data exchange of information between the control and the balancing unit in the arbor, such as is known in machines in accordance with the prior art, would be very disruptive here with small tool and workpiece diameters and would restrict the permitted shift range since a corresponding construction space has to be provided radially about the tool arbor for the rotational transmission.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:
1. A machining head for a gear manufacturing machine, comprising:

at least one driven motor spindle including at least one balancing device integrated within the at least one driven motor spindle;

at least one counter-spindle including at least one balancing device integrated within the at least one counter-spindle; and a tool arbor having at least one tool arranged thereon mounted between the motor spindle and the counter-spindles;

wherein the at least one balancing device integrated within the at least one driven motor spindle is completely or almost completely included within a housing of the motor spindle and is integrated into a rotor of the motor spindle, and wherein the at least one balancing device integrated within the at least one counter-spindle is completely or almost completely included within a housing of the counter-spindle and is integrated into a shaft of the counter-spindle.

2. The machining head of claim 1, wherein the at least one balancing device of the motor spindle and the at least one balancing device of the counter-spindle form a two-plane balancing device.

3. The machining head of claim 1, wherein the at least one balancing device of the motor spindle is arranged within the motor spindle behind or below a front spindle bearing of the motor spindle, and wherein the at least one balancing device of the counter-spindle is arranged within the counter-spindle behind or below a front spindle bearing of the counter-spindle.

4. The machining head of claim 1, further comprising at least one vibration sensor coupled to the motor spindle or the counter-spindle, wherein the at least one vibration sensor is configured to record vibrations during gear manufacturing machining, and wherein the at least one vibration sensor is communicationally connectable to a control of the gear manufacturing machine.

5. The machining head of claim 4, further comprising at least one signal transmitter configured to adjust the at least one balancing device integrated within the at least one driven motor spindle and the at least one balancing device integrated within the at least one counter-spindle, and wherein the at least one signal transmitter is arranged at a rear end of the motor spindle or the counter-spindle.

6. The machining head of claim 1, wherein a spacing between the counter-spindle and the motor spindle is variably adjustable to a length of the at least one tool and a length of the tool arbor.

7. The machining head of claim 1, wherein tools having small tool diameters are receivable on the tool arbor, and wherein the tools having small tool diameters include small grinding wheels, small grinding worms, and a combination of at least one small grinding worm and at least one small grinding wheel.

8. The machining head of claim 1, wherein the motor spindle is operable at a spindle speed of more than 8,000 revolutions per minute.

9. The machining head of claim 1, wherein no components of the at least one balancing device integrated within the at least one driven motor spindle are arranged in or at the tool arbor, and no components of the at least one balancing device integrated within the at least one counter-spindle are arranged in or at the tool arbor.

10. A gear manufacturing machine, comprising:
a control system; and
a machining head, including:
  a first balancing device positioned within a motor-driven spindle;
  a second balancing device positioned within a counter-spindle;
  a tool arbor mounted between the motor-driven spindle and the counter-spindle; and
  a signal transmitter;
  wherein the control system is configured to receive vibration parameters from the signal transmitter of the machining head; and
  wherein the control system includes instructions stored in non-transitory computer memory to adjust positions of the first balancing device and the second balancing device in response to the received vibration parameters, a spindle speed, or an angular position of the motor-driven spindle.

11. The gear manufacturing machine of claim 10, wherein the first balancing device and the second balancing device are positioned along a shared axis.

12. The gear manufacturing machine of claim 11, wherein a position of the first balancing device along the shared axis is adjustable by a first actuator, and wherein a position of the second balancing device along the shared axis is adjustable by a second actuator.

13. The gear manufacturing machine of claim 12, wherein the tool arbor is positioned along the shared axis.

14. The gear manufacturing machine of claim 13, wherein the signal transmitter is positioned at an end of the motor-driven spindle or an end of the counter-spindle, and away from the tool arbor.

15. A machining head for a gear manufacturing machine, comprising:
a first balancing device positioned within an interior of a first spindle;
a second balancing device positioned within an interior of a second spindle;
a shaft mounted between the first spindle and the second spindle, with the shaft configured to rotate along a shared axis of the first spindle and second spindle;
a first vibration sensor coupled to the first spindle;
a second vibration sensor coupled to the second spindle;
a control system electrically coupled with the first vibration sensor and the second vibration sensor;
a first actuator coupled with the first balancing device; and
a second actuator coupled with the second balancing device;
wherein the control system is configured to energize the first actuator in response to electrical signals from the first vibration sensor, and to energize the second actuator in response to electrical signals from the second vibration sensor.

* * * * *